United States Patent [19]

Jones et al.

[11] 4,129,272

[45] Dec. 12, 1978

[54] AEROFOIL STRUCTURE

[76] Inventors: Andrew W. Jones, 1 Cottage, Thriplow Farm, Thriplow, Near Royston, Herfordshire; Raymond Merry, 29 Osborne Sq., Dagenham, Essex, both of England

[21] Appl. No.: 826,256

[22] Filed: Aug. 19, 1977

[30] Foreign Application Priority Data

Aug. 23, 1976 [GB] United Kingdom ............... 35024/76

[51] Int. Cl.$^2$ ....................... B64C 31/06; B64D 17/02
[52] U.S. Cl. ............................. 244/153 R; 244/145; 244/152; 244/DIG. 1
[58] Field of Search ....... 244/153 R, 153 A, 155 RA, 244/154, 142, 145, 152, DIG. 1; 73/188, 189; D34/15 AF

[56] References Cited

U.S. PATENT DOCUMENTS

| 2,519,594 | 8/1950 | Ohland | 244/155 A |
| 2,737,360 | 3/1956 | Allison | 244/153 R |
| 3,091,420 | 5/1963 | Deguin | 244/155 R |
| 3,285,546 | 11/1966 | Jalbert | 244/DIG. 1 |
| 3,806,071 | 4/1974 | Brown | 244/153 R |
| 3,972,495 | 8/1976 | Jalbert | 244/145 |

Primary Examiner—Galen L. Barefoot
Attorney, Agent, or Firm—Scrivener, Parker, Scrivener & Clarke

[57] ABSTRACT

An aerofoil structure which is inflatable by ram air when in use, includes a flexible multi-cell air fillable envelope having a readily removable flexible spar at its leading edge whose ends provide anchorages for a pair of operator control lines. In use the spar flexes to accommodate variations in air speed over the envelope.

5 Claims, 7 Drawing Figures

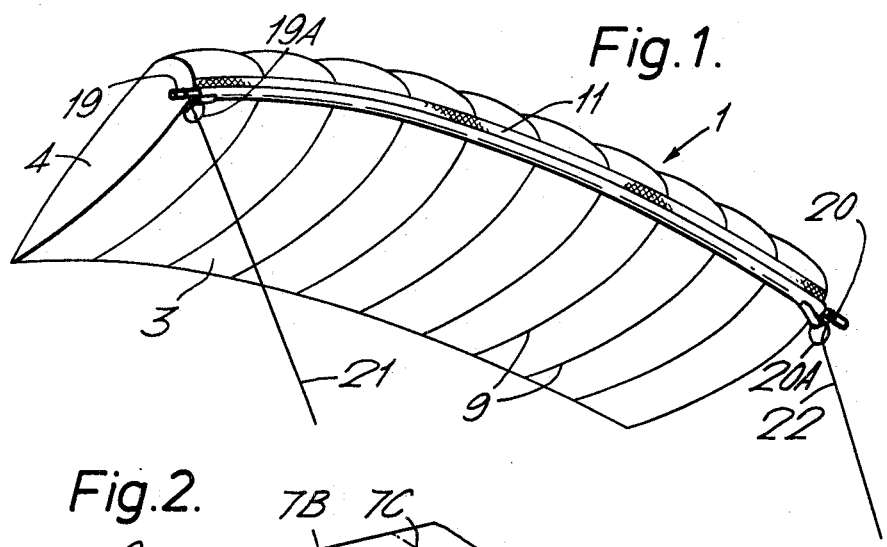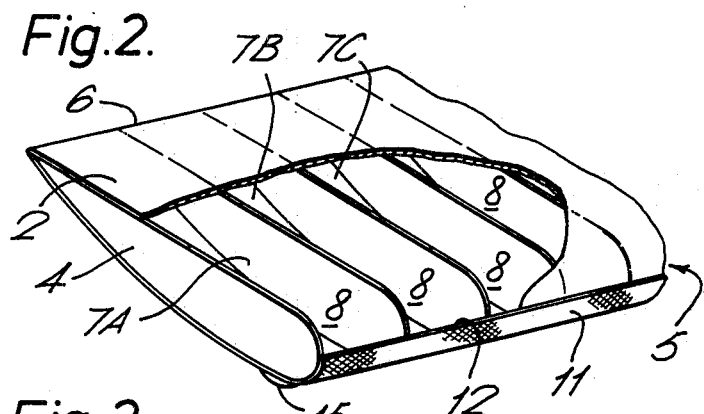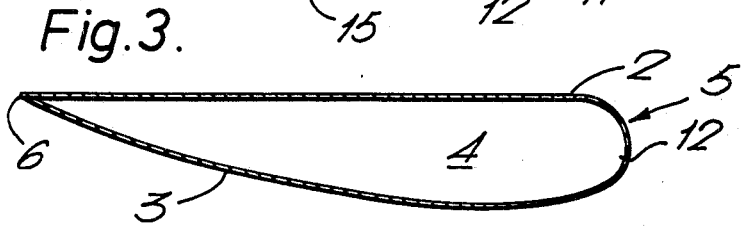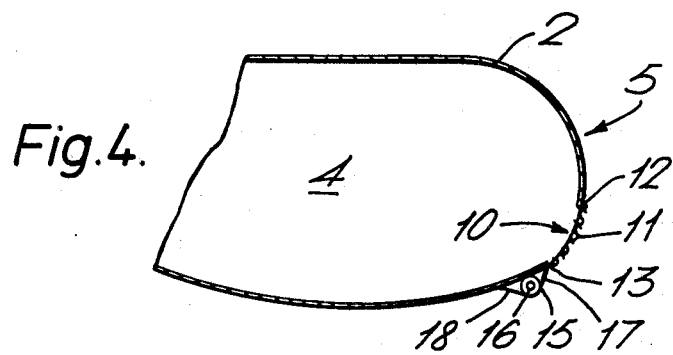

AEROFOIL STRUCTURE

BACKGROUND OF THE INVENTION

1. Field of the Invention

This invention relates to aerofoil structures which are in the form of hollow containers or envelopes made of flexible material and which are ram air inflatable.

In particular, the invention is concerned with such structures when utilized for controlled operation such as in tethered flight. For example, when used as a kite or as a prime mover for land or water going craft.

The particular form of kite for which the structure of the invention is concerned is suitable for performing aerobatics or the like controlled flight by means of control lines connected with the structure.

2. Summaries of the Invention

According to a first aspect of the invention there is provided an air inflatable aerofoil structure, including a container or envelope formed of a flexible material and which is intended to be inflated by ram air, and means connectable with an edge zone of the container or envelope for maintaining the container or envelope in an extended position in which it can inflate under the action of ram air, and for providing anchorage for tethering lines, control lines, load carrying lines or support means, the arrangement being such that the container or envelope is downstream of said means.

According to a second aspect of the invention there is provided a ram air inflatable wing structure including an elongate container or envelope so formed as to have an aerofoil section when inflated by air, and elongated stiffening means so connectable with the container or envelope as to extend lengthwise of the leading edge zone thereof thereby to maintain the container or envelope in an extended condition in which it is inflatable and to provide, at each end thereof, an anchorage for one of a pair of control lines by which the flight of the structure can be controlled.

Preferably the stiffening means is such that the wing structure automatically adjusts its flight attitude in response to wind pressures acting thereupon.

According to a still further aspect of the invention there is provided a kite or other flyable structure including a ram air inflatable wing-like envelope having an aerofoil cross-section, and a flexible member connectable with the envelope such as to extend the full width of the leading edge, said member serving to hold the envelope in a spread out condition in which it can be inflated by ram air, to provide at the ends thereof anchorage points for two control lines by which the kite or other structure can be controlled in flight, and to permit the kite or other structure automatically to adjust its flight attitude according to the wind conditions.

Preferably, the adjustment of the flight attitude includes not only variation in the angle of attack of the aerofoil with respect to the wind forces but also variation in the shape of the envelope in a direction lengthwise thereof.

Preferably the stiffening means comprises an elongate flexible spar having characteristics of flexure or deformation from an initial shape such that it remains in its initial shape for wind pressures associated with relatively low wind velocities and such that it progressively deforms to accommodate the wind pressures acting on the envelope at higher wind velocities.

Conveniently, the container or envelope is provided with a sleeve or other means for receiving the stiffening means in a readily removeable manner.

The stiffening means can comprises a spar of glass or carbon fibre so as to be capable of deformation without permanent set.

Preferably the spar is hollow.

Preferably, ram air inlet means is provided along the whole length of the leading edge of the envelope.

It is also preferred to form the container or envelope as a multi-cell construction, with the walls of the cells running from the leading to trailing edge of the container or envelope.

BRIEF DESCRIPTION OF THE DRAWINGS

For a better understanding of the invention and to show how to carry the same into effect reference will now be made to the accompanying drawings in which FIG. 1 is a perspective view of an aerofoil structure of the invention when providing a kite, the latter being shown in flight, and in a first flight attitude, FIG. 2 is a fragmentary part cut-away view of an inflated aerofoil structure of the invention, FIG. 3 is a view illustrating the particular formation of the aerofoil used in the structure, FIG. 4 is a fragmentary side view of a structure.

DESCRIPTION OF THE PREFERRED EMBODIMENT

Figure 5:
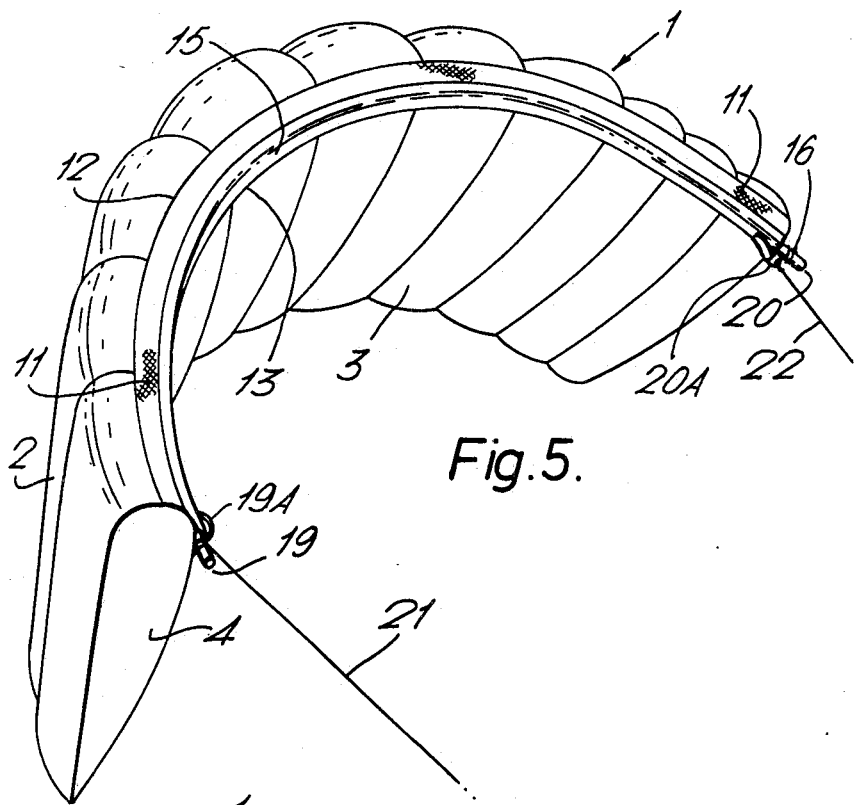
FIG. 5 is a perspective view of an aerofoil structure of the invention when providing a kite, the latter being shown when in a flight attitude characteristic of high wind velocities.
Figure 6:
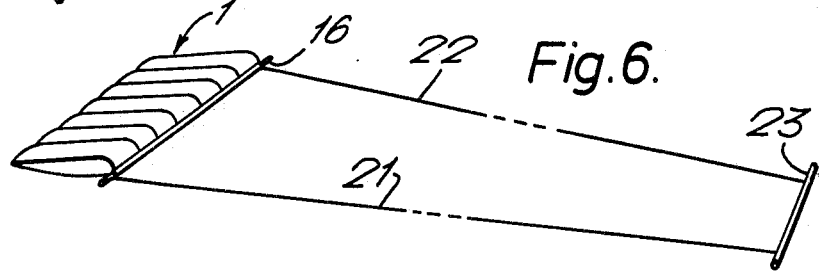
FIG. 6 is a schematic perspective view of an aerofoil structure when flying in relatively low wind velocities.
Figure 7:
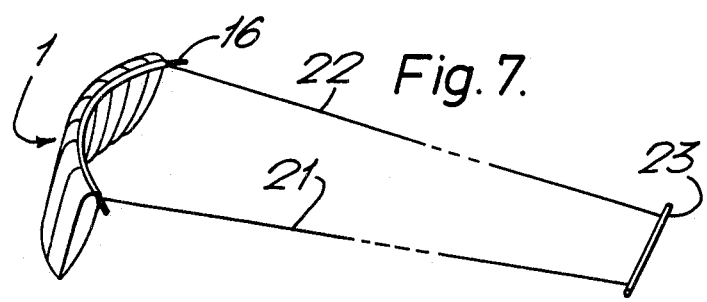
FIG. 7 is a schematic perspective view of an aerofoil structure of the invention when flying in relatively high wind velocities.

Referring to the drawings a flexible air inflatable structure 1 which serves as a wing in the case of a flyable object includes a generally rectangular top sheet or skin 2, a bottom sheet or skin 3 and end walls 4 having a shape forming an aerofoil type section as shown in FIG. 3.

The top and bottom sheets are connected along their longer edges 5 and 6 to provide the leading and trailing edges of the structure, and along their shorter edges to the walls 4.

The mode of connection can be in any convenient manner, such as for example, by stitching, by heat welding by adhesives, by various combinations of the forgoing or other convenient methods.

The material from which the top and bottom sheets and the end walls are formed has to be flexible, non-stretchable and also impervious to air. On such material is known as 'Rip Stop Spinnaker Nylon' (RTM) this material having a substantial resistance to the tearing effect of wind forces. When the sheets and walls are stitched Polyester thread is a suitable sewing material.

On securing the top and bottom sheets and the end walls a hollow envelope or container is formed which provides a ram air fillable structure when in use.

The interior of the container is sub-divided into separate compartments 7A, 7B, 7C, etc., by internal walls 8 having the same aerofoil shape as the walls 4. The walls 8 are secured to the sheets 2 and 3. In a practical structure forming a kite in which the overall dimensions were 1830mm × 620mm the structure was divided into ten compartments by nine of the walls 8. The positions of the walls 8 are indicated by stitch lines 9.

A generally rectangular opening 10 for the inflating ram air is provided along the whole length of the leading edge 5 of the top sheet 2 to enable simultaneous admission of air to all of the compartments 7A, 7B, 7C etc. The opening 10 is effectively defined by a gauze or other net-like material strip 11 whose upper longitudinal edge 12 is secured to the top edge of the opening 10 and whose lower longitudinal edge 13 is similarly secured to the leading edge of the bottom sheet 3. The ends of the strip 11 are secured to the end walls 4.

A pocket or sleeve 15 for receiving a flexible spar 16 is provided along the leading edge of the sheet 3. The sleeve 15 has a leading edge 17 and a trailing edge 18 and is attached to the underside of the bottom sheet 3. Alternatively the leading edge region of the bottom sheet can be turned back to provide material for the sleeve.

The spar is formed from a material providing a high degree of flexibility and which is light in weight. The spar is hollow and is formed from glass or carbon fibre. For a structure of the dimensions mentioned the spar dismantles into two sections. Each section is tapered so that the stiffness of the central zone of the assembled spar is greater than that of the end regions of the spar whereby the end regions deform to a greater extent than the central zone.

When the spar is in the sleeve the ends 19, 20 of the spar project sufficiently outwardly of the structure 1 as to enable attachment of control lines 21, 22 to the spar ends and also to ensure that the spar ends cannot foul the adjacent portions of the sheets 2 and 3. In addition, ring-like means are provided at the leading edge corners so that on fitting the spar the corners can be positionally located with respect to the spar. The other ends of the control lines 21, 22 are connected to a control bar 23 which is hand held by the user of the structure.

It is convenient to regard the structure as a multi-cell arrangement which comprises a series of side-by-side compartments 7A, 7B which define a series of funnels or wind-sock like formations into which the ram air enters through the strip 11 thereby to 'blow-up' the individual compartments and thus provide the structure with sufficient rigidity i.e., a state of stiffness, for the aerodynamic properties of the aerofoil formation to be presented by the inflated structure on oncoming wind that is maintaining the inflation.

To fly the structure as a kite the spar 16 is engaged in the sleeve 15 and the control lines attached to the ends 19, 20 of the spar. The mode of tying or attaching the lines 21, 22 can be a matter of personal choice.

The structure is arranged with the air inlet strip 11 facing the oncoming wind and the control bar 23 is held by the person who is to fly the structure. The wind blows into the interior of the structure and fills the compartments. The said person exerts tension on the control lines and as a result of the air filling and the tension the structure lifts and swings upwardly into the air to fly at a height set by the available length of the control lines.

The flight position assumed by the structure is maintained as a consequence of a complex combination of forces acting upon the structure, these forces including aerodynamic lift forces arising from movement of air across the sheets 2 and 3, tension forces applied to the control lines, the effect of the wind pressure on the tethered structure, the weight of the structure and spar, and the effect of the individual belling outwards of the compartments leading to a channelling of air.

The above forces result in a flight position or attitude in which the structure extends rearwardly of the spar, that is to the rear of the bridling point. That is all of the lift is behind the bridling point During flight the attitude adopted by the structure in relation to the control lines is a function of the instantaneous air speed over the top and bottom sheets and it is found that this attitude varies significantly with changes in this speed. Thus when flying the structure the following series of changes of attitude and shape of the structure can be noted with respect to the plane containing the control lines and a line joining the regions of connection of the lines with the spar 16 this line being hereinafter called the 'attachment line'.

For the purposes of the following discussion the simplest case of control line flight will be considered and for this purpose it will be assumed that the tension in the control lines is balanced and that the 'attachment line' is horizontal and is parallel to the control bar 23. It will be presumed that the control lines are straight in that they do not have any vertical catenary like sag.

When the wind velocity is relatively low resulting in low air speed over the sheet surfaces the resulting forces on the structure are such that the spar 16 is relatively straight, i.e., only very slightly deformed, and the structure itself adopts a flying attitude in which the angle of attack is small, i.e., within a range 0°–10°. That is to say the structure flys substantially horizontal with the trailing edge slightly lower than the leading edge. The precise attitude of flight is released to the aerodynamic profile of the structure, the centre of gravity of the structure, the horizontal and vertical components of the control line tensions, and the wind velocity.

As the wind velocity increases resulting in an increased airspeed over the structure the spar 16 starts to deform into a curved shape. It will be appreciated that the spar ends move towards each other along the 'Attachment line'.

Simultaneously with this deformation of the spar the following major changes in the visual appearance of the structure are seen to occur:

1. The structure bodily deforms from a generally rectangular shape into a curved shape very similar to a section from a frustum of a conical surface in which the leading edge has a transverse width differing from that of the trailing edge since the corners of the latter are not constrained in the same way as the leading edge corners and since the belling out of the compartments is not constant along the length thereof.

2. The body of the structure moves away from the generally horizontal position into a flight attitude which is substantially vertical so that the angle to the control line plane is very large. In this position the structure presents a relatively large surface area to the oncoming wind.

3. The spar, whilst deforming, effectively turns or pivots about the 'attachment line' so that a plane containing said ends and the centre point of the spar is inclined to said control line plane, the inclination being such that the spar centre is above the control line plane.

4. Consequential upon factors 1, 2 and 3 developing simultaneously the structure will be seen rapidly to accelerate its motion in a direction at right angles to the control line plane.

The following observations are believed to provide a possible analysis of the situation.

When the wind speed is low, that is at a value at which the spar remains relatively straight the flight characteristics of the structure are set essentially by the aerodynamic forces arising from the particular aerofoil shape adopted for the structure, during the passage of wind over the upper and lower sheets 2 and 3. In the particular instance the aerofoil shape adjacent the leading edge defines the classic conditions necessary to attain lift whilst adjacent to the trailing edge the reflex shaping in conjunction with the flat top shape to the aerofoil (See FIG. 3) leads to an inverse of the leading edge conditions, i.e., a downwardly directed force. Furthermore, the force distribution along the length of the structure is such that the wind forces acting at the central regions of the spar 16 are not sufficient to deform the spar into a noticably curved shape. Consequently, the structure shape is not changed.

As the wind velocity increases the various pressure differentials produced by the aerofoil shaping are likewise increasing. Since the ends of the spar are effectively positionally fixed by the control lines the force increase is accommodated by the change in control line tensions and the deformation of the spar. To accommodate the resulting pressure differentials acting on the structure and the spar the structure would, if it remained in the low wind speed position, have to stretch at the trailing edge, assuming the leading edge does not crumple or otherwise collapse, such that it becomes trapizoidal with the trailing edge longer than the leading edge. Since the structure forming material is non-stretchable and because the inflated structure is essentially found to be non-collapsible the flight attitude has to change. Thus the structure has to turn about the spar from the low angle of attack position into a setting which allows the structure to reshape itself by deforming into a curved profile which allows for the degree of spar deformation involved. This reshaping is from the 'flat' rectangular shape to the previously mentioned conic frustum shape. Because of the downward thrust which is produced at the trailing edge by the reflex shape of the structure aerofoil the structure turns downwardly relative to the control line plane. It will be understood that the lift at the leading edge aids the turning effect.

Following the attitude change the air flows over the sheets 2 and 3 will have also changed. These changes are of a complex character and in practice produce further changes in the flight attitude in addition to those arising from spar deformation because of the displacement of the aerofoil centre of pressure, the alterations to the pure aerodynamic lift and drag forces, and components of control line tension both along and perpendicular to the aerofoil chord line.

As the wind speed increase the magnitude of the consequential wind forces acting on the spar and structure will correspondingly increase so that the deformation of the spar will increase and the resulting flight position of the structure will likewise be changed such that the flight attitude adopted and the speed of translation through the air relative to said person reflects the wind speed prevailing.

In practice, by varying the relative tensions in the control lines the person controlling the flight is able to vary the direction of flight. This control is possible throughout a wide range of wind velocities and conditions. The nature of the flight phenomena of the structure can be selectively controlled by the user varying the orientation of the control bar relative to the flying control lines. Therefore, depending upon the skill and experience of the user the structure can be caused to undergo a wide range of aerobatic manoeuvres by various combinations of control line tensions and control bar movements.

In addition it will be noted that the curved shape of the structure will induce a funnelling effect which has been found to facilitate the efficiency of the structure when in use or flight arising from differential tensions applied to the control lines.

It is believed that for any particular wind velocity the overall extent of spar deformation, curving of the structure, and the tilting of the plane containing the central regions of the spar and the attachment regions is such as to reduce the drag forces i.e., resistance to flight forces acting on the structure to a minimum. This situation stems from the fact that the bridling or tethering of the structure is in practice positioned in advance of the leading edge and that the body of the structure is effectively free to move or deform to a position and shape offering least resistance to air flows produced on the structure by the wind.

Furthermore, it is thought that for any particular speed over the aerofoil surfaces the air speed is a result of the wind velocity and the velocity of the wing structure in relation to the control line plane and in particular to said person flying the structure.

As can be particularly seen in the FIG. 3 the top surface of the aerofoil is relatively flat from a position to the rear of the leading edge whilst the bottom suface has a reflex region in the vicinity of the trailing edge. This combination of shaping provides the previously mentioned lift forces at the leading edge and the down thrust at the trailing edge.

It will be understood that other aerofoil shapes can be used provided that the shaping therof affords the desired combination of lift at the leading edge and the down thrust at the trailing edge.

We claim:

1. An aerofoil structure arranged for airborne flight under the influence of an air stream comprising an envelope of flexible light-weight material having leading and trailing edges with respect to air flow, the leading edge facing upstream in flight, said envelope having upper and lower surface members, a plurality of separator members between and joined to the surface members to divide the interior of the envelope into a plurality of elongate chambers, and an elongate opening along the leading edge between the surface members to permit the ingress of ram air to inflate the chambers, the separator members being shaped to cause the upper and lower surface members to assume an aerofoil section in the direction of flow of the air stream; an elongate spar positioned along the leading edge of the bottom surface member transverse the direction of air flow, the ends of the bottom surface member leading edge and the ends of the spar being arranged to form anchor points respectively and a pair of control lines, one secured respectively to each of said anchor points, the spar being sufficiently flexible to assume a degree of curvature when the structure is in flight.

2. An aerofoil structure as claimed in claim 1, in which the spar has a graduated flexibility with respect to its length such that it is stiffer throughout its central portion than at its end portions than at its end portions.

3. An aerofoil structure as claimed in claim 2, in which the material forming the lower surface member adjacent the opening is formed into a sleeve to receive and house the spar, the spar being readily withdrawable from the sleeve when the structure is not in use.

4. An aerofoil structure as claimed in claim 3, in which the separators are each wedge-shaped and taper from a rounded leading edge substantially to a point at the trailing edge, the separators further having a substantially linear upper edge and a convex lower edge, and in which the material forming the upper surface member extends from the trailing edge of the separators along the top edge and partially around the leading edge.

5. An aerofoil structure as claimed in claim 1, in which both control lines extend at least to the surface of terrain over which the structure is airborne.

* * * * *